No. 857,769. PATENTED JUNE 25, 1907.
F. W. SUTER & C. WAYMAN.
SAFETY LAMP AND AIR CARBURETING APPARATUS THEREFOR.
APPLICATION FILED JAN. 26, 1907.
3 SHEETS—SHEET 1.
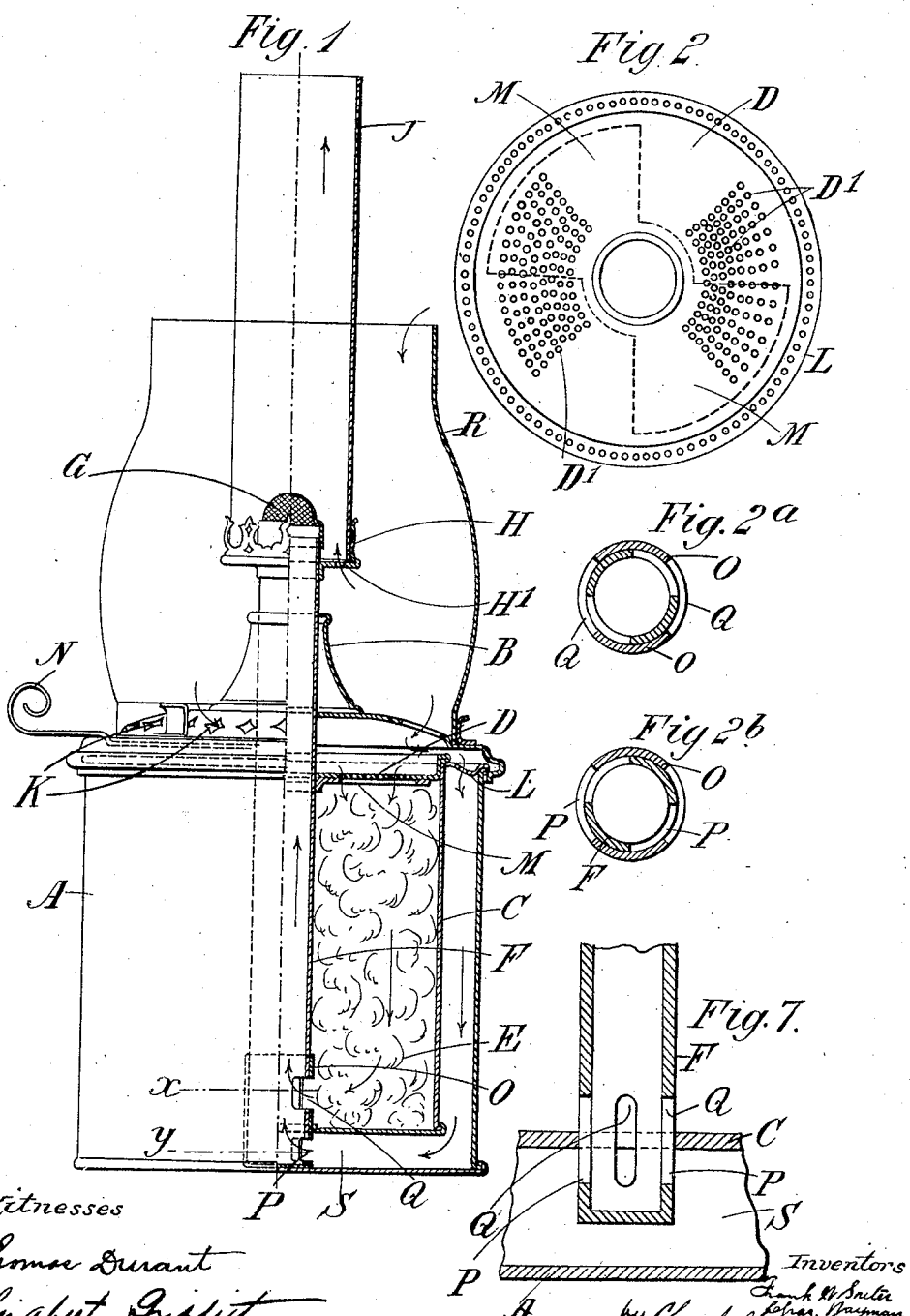

No. 857,769. PATENTED JUNE 25, 1907.
F. W. SUTER & C. WAYMAN.
SAFETY LAMP AND AIR CARBURETING APPARATUS THEREFOR.
APPLICATION FILED JAN. 26, 1907.
3 SHEETS—SHEET 2.
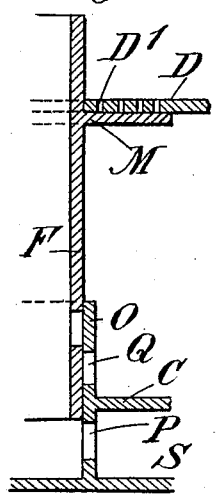
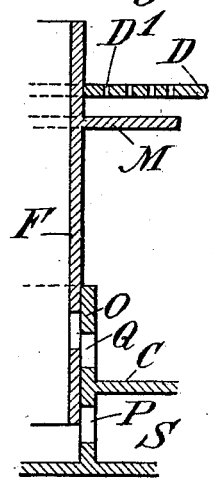
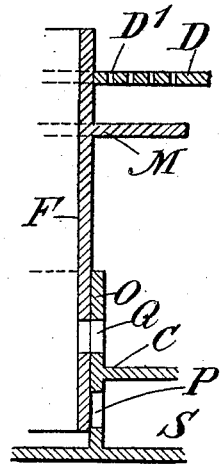
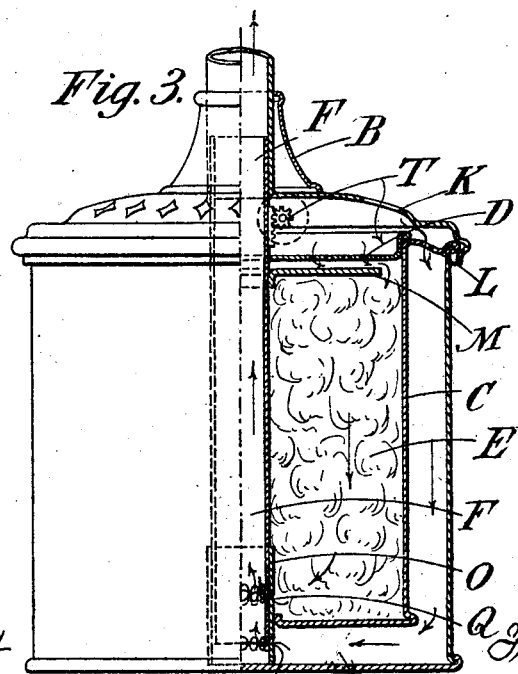

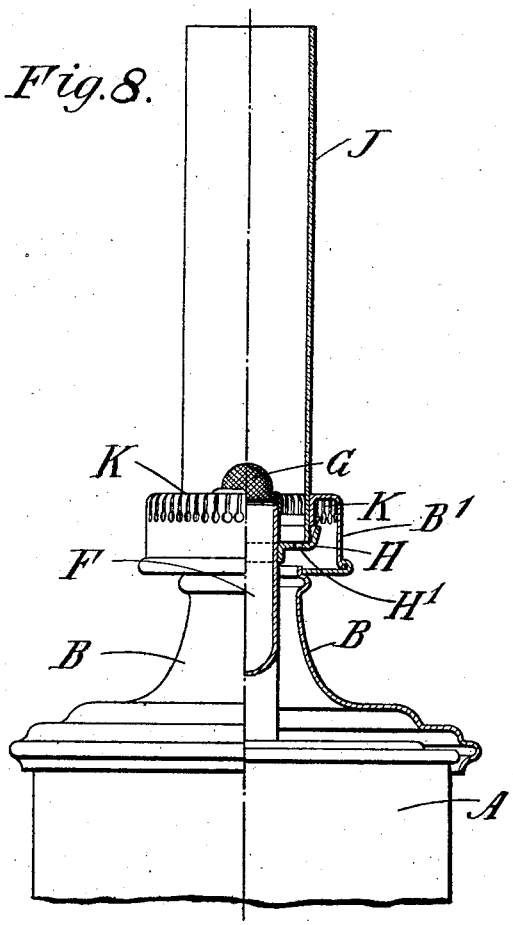

UNITED STATES PATENT OFFICE.

FRANK WEST SUTER AND CHARLES WAYMAN, OF LONDON, ENGLAND.

SAFETY-LAMP AND AIR-CARBURETING APPARATUS THEREFOR.

No. 857,769.      Specification of Letters Patent.      Patented June 25, 1907.

Application filed January 26, 1907. Serial No. 354,285.

*To all whom it may concern:*

Be it known that we, FRANK WEST SUTER and CHARLES WAYMAN, subjects of the King of England, and residing, respectively, at Upper Holloway, London, England, and Church End, Finchley, London, England, have invented a certain new and useful Improved Safety-Lamp and Air-Carbureting Apparatus Therefor, of which the following is a specification.

This invention relates to improvements in safety lamps and apparatus for burning carbureted air. The type of lamp on which this is an improvement comprises a vessel containing absorbent material charged with a hydrocarbon, a central tube terminating in a burner and suitable passages through which air enters the carbureting chamber and also passes into the central tube where it mingles with the carbureted air. By introducing a draft in the burner tube air is drawn through the passages and becoming carbureted can be ignited at the burner.

According to this invention the chamber containing the absorbent material which may be termed the carbureter is inclosed in an outer case between which and the carbureter is left a space. We also employ a central glass chimney and an outer glass globe. There is also a tube which may be described as the burner tube at one end of which the burner is fixed and is provided with a gallery supporting the central glass chimney before mentioned. This burner tube extends into and through the carbureter projecting into the space before mentioned between the carbureter and outer case. Openings are provided at the lower end of the burner tube which project into the space between the carbureter and outer case and may be described as the air ports. Openings are also provided on the part of the burner tube inside the carbureter which may be called the gas ports. In conjunction with these openings there are also provided openings in the carbureter which may be described as the admission ports. These openings may be partially or completely closed by means of a rotary or longitudinal motion of the burner tube and are so arranged that when the admission ports are closed the gas ports are also closed and the air ports are open conversely when the air ports are closed and the gas ports and admission ports will be open. It follows therefore that all these ports will be half open simultaneously. In order to get perfect combustion it may be necessary to decrease the quantity of carbureted air to the burner. For this purpose the openings previously described as gas ports are partially closed the process of doing this will also partially open the openings previously described as the air ports. This causes the flow of air to be decreased through the carbureter a portion of which is thereby diverted to the space between the carbureter and the outer case through which it passes to the air ports. It then travels along the burner tube mixing with the carbureted air which is admitted by the gas ports. By this method it is possible to regulate the flame. The heat radiated from the central chimney heats the current of air as it passes between the central chimney and the outer globe consequently heated air passes through the carbureter and heated air passes between the carbureter and outer case heating the material containing the volatile hydrocarbon during its journey to the burner.

In the accompanying drawings, Figure 1 is an elevation half in vertical section of a lamp constructed in accordance with this invention. Fig. 2 is a plan of the casing and carbureter chamber with the top of the casing removed. Fig. $2^a$ is a section through the burner tube on the line $x$—$x$ of Fig. 1. Fig. $2^b$ is a section through the burner tube on the line $y$—$y$ of Fig. 1. Fig. 3 is an elevation half in vertical section of a modified construction of the lamp. Figs. 4, 5 and 6 are sectional details of the ports. Fig. 7 is a sectional view of a detail modification. Fig. 8 is an elevation half in vertical section of the upper part of a lamp showing a further modification.

Like letters indicate like parts throughout the drawings.

The body of the lamp comprises a casing A with a removable top B which is sprung on or attached in some other convenient manner. Within the casing A is disposed a chamber C provided with a top D which is conveniently of that well known form which can be lifted by placing a coin for the like under an overhanging flange. The space E in the chamber C is filled with some suitable absorbent material. Centrally within the chamber C is situated a tube F which forms the burner tube and projects through the cover B terminating in a perforated cap G which constitutes the burner above which may be suspended if desired an incandescent mantle or the like which is not however shown in the drawings.

The tube F carries a gallery H which supports a chimney J the usual perforations H' being provided in the gallery to allow of the admission of air to the burner.

A series of openings K are formed in the cover B of the casing A, other openings L are provided in a portion of the wall of the chamber C which is flanged outwardly to support and hold in place this chamber. There are openings also D' in the cover of the carbureter chamber C and beneath these is disposed a quadrantal plate M. The plate M is secured to the tube F which can be rotated as desired by a projecting handle N so that by causing the plate M to cover or uncover the holes D' the amount of air entering the carbureting chamber can be regulated.

The rotation of the tube F enables the amount of inflammable mixture issuing from the carbureter chamber into the burner tube to be varied and also the supply of fresh air which enters this tube and mixes with the inflammable mixture. This regulation is effected by disposing in the bottom of the chamber C a tube O which projects into the jacket space beneath the chamber. There are openings P in this tube O in the jacket space and other openings Q in the carbureter. Corresponding openings are made in the wall of the tube F these openings being so disposed relatively as will be seen from Figs. 2$^a$ and 2$^b$ that as the tube F is rotated in one direction the openings Q will be closed and the openings P opened but if the tube F is rotated in the opposite direction the passages Q will be opened or their openings increased while the openings P are gradually closed.

It will thus be seen that by adjusting the burner tube there is simultaneous regulation of the amount of air entering the carbureter, the amount of inflammable mixture issuing therefrom into the burner tube and the amount of fresh air passing through the jacket space into the burner tube. The amount of this fresh air supply will be increased as the amount of air flowing through the carbureter chamber is decreased and conversely.

On the cover B of the casing A is preferably mounted an outer chimney or glass globe R down through which must pass the air supply for the carbureter. In passing through the space between the globe R and the burner this air is warmed with the result that the temperature of the carbureter is maintained fairly constant owing to the air jacket through which this warmed air passed. The warmth of the air is also of use in effecting the carbureting of the air before it enters the burner tube.

In the construction shown in Fig. 3 and the detail views Figs. 4, 5 and 6 the regulation of the air admission ports D' to the carbureter and the mixture of the openings Q and air passages is effected by raising and lowering the burner tube F instead of imparting rotation thereto as in the previously described construction. The plate M is formed as a disk whose proximity to the top D can be varied and thus the flow of air through the ports D' can be restricted or not as desired. Only one set of openings in the burner tube is necessary these openings registering with the ports Q in the tube O. The lower end of the wall of the tube F itself serves to cover and uncover the air admission ports P; when the tube is raised the air thus flows into the open end thereof.

Fig. 4 shows the parts in position when the tube F is in its fully raised position. The disk M has closed the ports D' entirely and the openings in the tube are raised out of register with the ports Q which are consequently closed. The air passages P however are wid open. In Fig. 5 the tube is shown in a mid position when the ports Q are half open and the ports P half closed. Fig. 6 shows the burner tube F in its lowest position where the air openings P are shut and the ports Q fully open.

In Fig. 7 a modification is shown for regulating the admission of inflammable mixture and air to the tube F. The fixed tube O is here dispensed with the tube F passing through a central opening in the bottom plate of the carbureter chamber C. Only one set of openings is made in the wall of the tube F these openings being elongated as shown so that a portion can lie on either side of the bottom of the carbureter chamber. With the tube in the intermediate position shown in Fig. 7 it will be seen that air can pass from the jacket S through lower parts of the openings in the tube F while inflammable mixture can pass into the burner tube through the upper portions of these openings. After the tube is lowered the ports will be shut off from the carbureter chamber and opened to the jacket space and after the tube has been raised the converse will take place. The raising and lowering of the tube F may conveniently be effected by a milled head or wheel on a spindle carrying a pinion T which engages with a rack mounted on the tube.

In Fig. 8 is shown a modification where the glass globe R is dispensed with and in substitution the cover B is carried up around the gallery H leaving an air space between the cover and the burner tube and terminating in a cap B' in which are the air inlets K. It will be seen that the air is in this case caused to enter close around the burner and it thus becomes warmed or heated to the desired extent the heated air then passing down beneath the cover B to the jacket space and to the carbureter.

It will be readily understood that in each construction the operation of the lamp is as follows:—Some suitable material charged with volatile hydrocarbon is placed in the carbureter chamber and a flame applied to the openings H' in the gallery around the burner or in some other way so as to induce a current of air up the chimney and through the lamp. The air entering the body of the lamp becomes carbureted and immediately ignites at the burner the necessary draft to keep the burner alight being subsequently automatically maintained.

What we claim as our invention and desire to secure by Letters Patent is:—

1. In a lamp for burning carbureted air the combination of a carbureting chamber containing absorbent material, an outer casing forming an air jacket and enveloping the chamber, a central tube terminating in a burner, inlets for air drawn from around the chimney leading to the chamber, and to the jacket space, and ports leading from the carbureting chamber and the jacket space respectively into the central tube, as set forth.

2. In a lamp for burning carbureted air the combination of a carbureting chamber containing absorbent material, an outer casing forming an air jacket and enveloping the chamber, a central tube terminating in a burner, inlets for air drawn from around the chimney leading to the chamber and to the jacket space, ports leading from the carbureting chamber and the jacket space respectively into the central tube, valves controlling these ports and means for simultaneously operating these valves as set forth.

3. In a lamp for burning carbureted air the combination of a carbureting chamber containing absorbent material, an outer casing forming an air jacket and enveloping the chamber, a central tube terminating in a burner, inlets for air drawn from around the chimney leading to the chamber and to the jacket space, ports leading from the carbureting chamber and the jacket space respectively into the central tube, valves controlling these ports, a valve controlling the passage of air into the carbureting chamber and means for simultaneously operating all these valves as set forth.

4. In a lamp for burning carbureted air the combination of a carbureting chamber containing absorbent material, an outer casing forming an air jacket and enveloping the chamber, a central tube terminating in a burner, a chimney carried in a gallery on the upper end of the burner tube, an outer chimney carried on the outer casing, air inlets leading from the space between the inner and outer chimneys into the chamber and into the jacket space and ports leading from the carbureting chamber and the jacket space respectively into the central tube as set forth.

5. In a lamp for burning carbureted air the combination of a carbureting chamber containing absorbent material, an outer casing forming an air jacket and enveloping the chamber, a central tube terminating in a burner a chimney carried in a gallery on the upper end of the burner tube, an outer chimney carried on the outer casing, air inlets leading from the space between the inner and outer chimneys into the chamber and into the jacket space, ports leading from the carbureting chamber and the jacket space respectively into the central tube, valves controlling these ports, a valve controlling the passage of air into the carbureting chamber and means for simultaneously operating all these valves as set forth.

6. In a lamp for burning carbureted air the combination of a carbureting chamber containing absorbent material, an outer casing forming an air jacket and enveloping the chamber, a central tube terminating in a burner a chimney carried in a gallery on the upper end of the burner tube, an outer chimney carried on the outer casing, air inlets leading from the space between the inner and outer chimneys into the chamber and into the jacket space, ports leading from the carbureting chamber and the jacket space respectively into the central tube, valves carried by the burner tube and controlling these ports, a valve carried by the burner tube and controlling the passage of air into the carbureting chamber and means for moving the burner tube and simultaneously operating all these valves as set forth.

7. In a lamp for burning carbureted air the combination of a carbureting chamber containing absorbent material, an outer casing forming an air jacket and enveloping the chamber, a central tube terminating in a burner a chimney carried in a gallery on the upper end of the burner tube, an outer chimney carried on the outer casing, air inlets leading from the space between the inner and outer chimneys into the chamber and into the jacket space, ports leading from the carbureting chamber and the jacket space respectively into the central tube, valves carried by the burner tube and controlling these ports, a valve carried by the burner tube and controlling the passage of air into the carbureting chamber and means for rotating the burner tube and simultaneously operating all these valves as set forth.

8. In a lamp for burning carbureted air the combination of a carbureting chamber containing absorbent material, an outer casing forming an air jacket and enveloping the chamber, a central tube terminating in a burner, inlets for air drawn from around the chimney leading to the chamber and to the jacket space, ports leading from the carbureting chamber and the jacket space respectively into the central tube, valves carried by the burner tube and controlling these ports, a valve carried by the burner tube and controlling the passage of air into the carbureting chamber and means for moving the burner tube and simultaneously operating all these valves as set forth.

9. In a lamp for burning carbureted air the combination of a carbureting chamber containing absorbent material, an outer casing forming an air jacket and enveloping the chamber, a central tube terminating in a burner, inlets for air drawn from around the chimney leading to the chamber and to the jacket space, ports leading from the carbureting chamber and the jacket space respectively into the central tube, valves carried by the burner tube and controlling these ports, a valve carried by the burner tube and controlling the passage of air into the carbureting chamber and means for rotating the burner tube and simultaneously operating all these valves as set forth.

In testimony whereof I have signed my name to this specification in the presence of two subscribing witnesses.

FRANK WEST SUTER.
CHARLES WAYMAN.

Witnesses:
R. E. DUNBAR KILBURN,
MAURICE STRODE.